Dec. 24, 1940.   T. J. CARMICHAEL   2,225,978
VEHICLE BRAKE GOVERNOR
Filed March 31, 1939   2 Sheets-Sheet 1

Inventor
Thomas J. Carmichael
By Blackmore, Spencer & Flint
Attorneys

Dec. 24, 1940.   T. J. CARMICHAEL   2,225,978
VEHICLE BRAKE GOVERNOR
Filed March 31, 1939   2 Sheets-Sheet 2
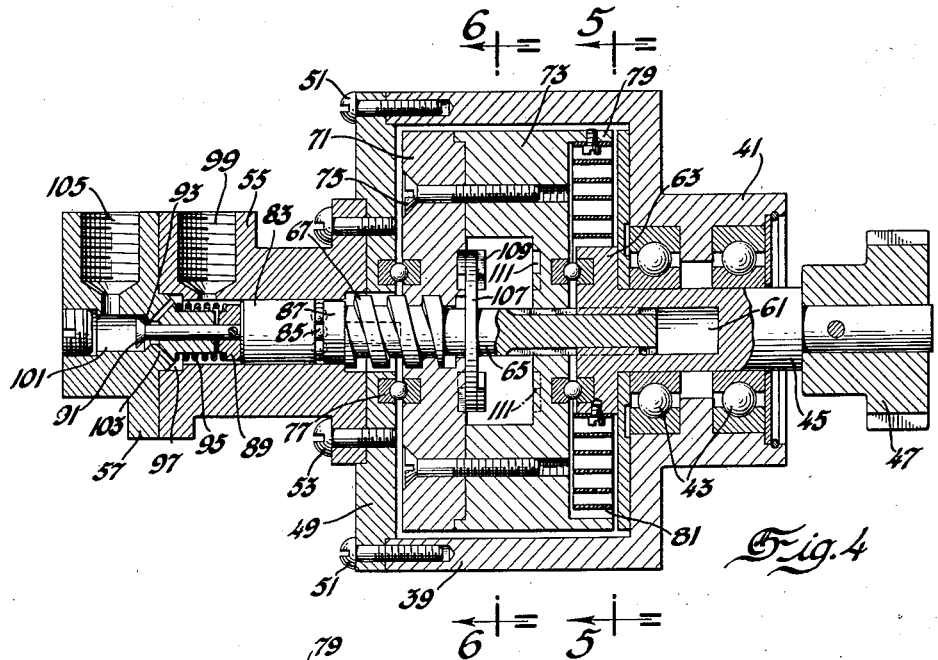
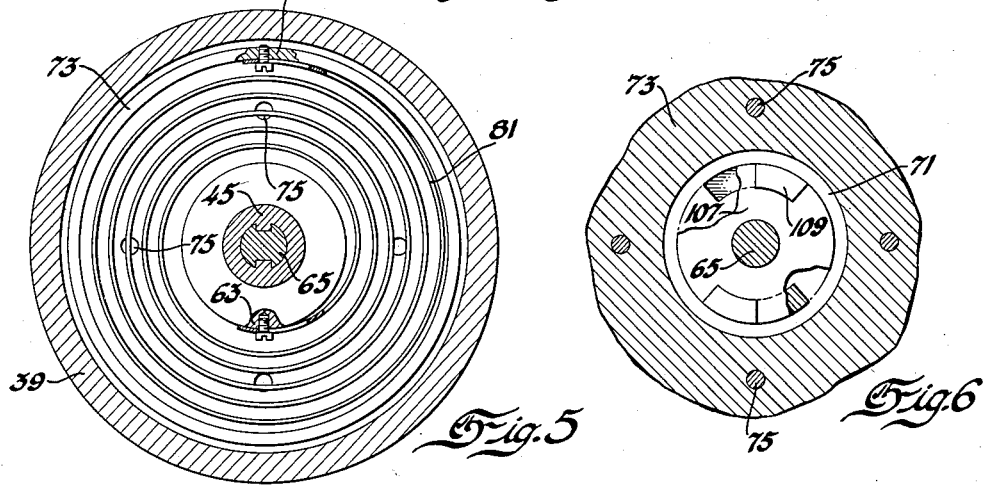
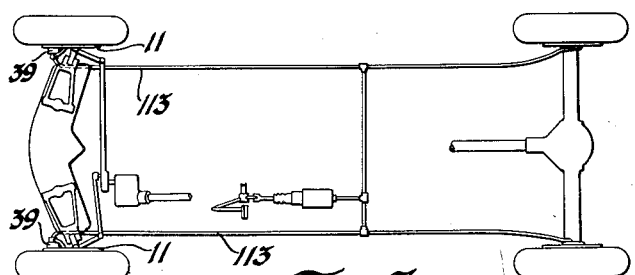
Inventor
Thomas J. Carmichael
By
Blackmon, Spencer & Hink
Attorneys Patented Dec. 24, 1940

2,225,978

UNITED STATES PATENT OFFICE 2,225,978

VEHICLE BRAKE GOVERNOR

Thomas J. Carmichael, Walled Lake, Mich., assignor to General Motors Corporation, Detroit, Mich., a corporation of Delaware Application March 31, 1939, Serial No. 265,317

7 Claims. (Cl. 188—181)

This invention relates to brakes operable to decelerate moving vehicles.

An object of the invention is to provide an arrangement to insure maximum braking efficiency and to avoid loss of steering control resulting from excessive braking applied to steering wheels.

Other objects will be understood from the description which follows.

A brake acting on a rotating vehicle wheel affords maximum efficiency in retarding the travel of the vehicle when the braking force so applied may not be increased without causing that wheel to slip and cease to rotate. Not only does the applied force at any wheel cease to be useful to stop the vehicle travel when the wheel rotation stops, but, in the case of a ground engaging steering wheel, the operator loses control of the path of travel of the vehicle. The operator of a vehicle equipped with conventional brakes knows that there is a critical pressure which he may not exceed without loosing the retarding effect of one or more of his wheel brakes and which he may not exceed without losing steering control if he happens to lock a steering wheel. In avoiding the danger he never applies the brakes to an extent such as to get their full retarding effect. In accordance with the present invention the operator is not so handicapped. He is able to obtain the greatest retarding effect of which the brakes are capable and to do so without risking loss of braking at individual wheels and without fear of losing steering control. Briefly stated, the invention makes use of mechanism associated with each individual wheel which, in the event of such a brake application to that wheel as would stop its rotation, serves to release the brake applied to that wheel whereupon the wheel is then free to roll and receive braking force as before. The action of the mechanism will repeat itself until normal conditions prevail.

The invention is illustrated in the accompanying drawings:

Figure 4 is a transverse section through the novel brake control mechanism.

Figures 5 and 6 are sections indicated by lines 5—5 and 6—6 of Figure 4 respectively.

Figure 7 is a diagrammatic plan view of a vehicle having steering wheels and differentially connected driving wheels, and a hydraulic braking system with which the improvement of this invention is associated.

Figure 1:
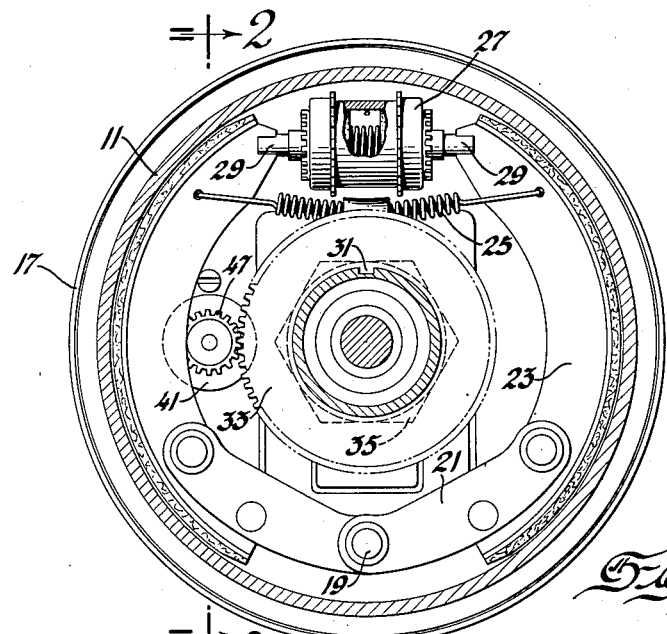
Figure 1 is a sectional view through the brake drum, the section being substantially on line 1—1 of Figure 2.
Figure 2:
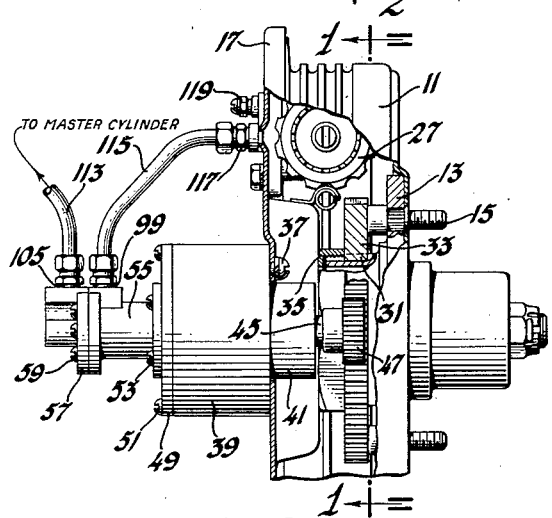
Figure 2 is a sectional view substantially as seen from line 2—2 of Figure 1.
Figure 3:
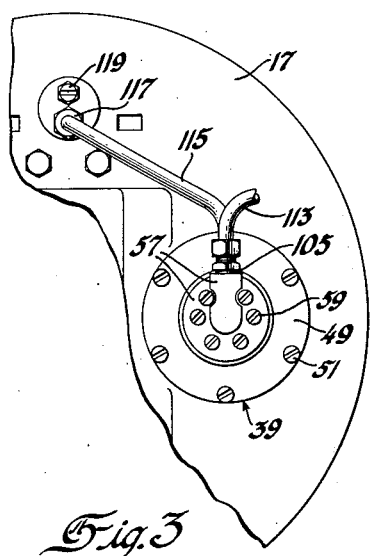
Figure 3 is a view in end elevation showing a part of the backing plate equipped with an embodiment of this invention.

Referring by numerals to the drawings, 11 designates a brake drum. One such drum is secured to each of the wheels of the vehicle. Figure 2 shows the drum secured to the hub 13 by cap screws 15. A cover plate secured in position and closing the open side of the drum is designated by numeral 17. It carries an anchor pin 19 on which articulate links 21 associated with brake shoes 23. Spring 25 represents any convenient resilient means for withdrawing the shoes from contact with the drum. They are expanded by a hydraulic motor or so-called wheel cylinder 27. Projecting from the wheel cylinder are plungers 29 adapted to be moved outwardly by the fluid medium and expand the shoes into contact with the drum. The wheel cylinder is as usual secured to the cover plate. Within the drum and locked to the wheel hub by a key 31 is a ring gear 33. The gear is positioned between the heads of the securing cap screws 15 and a nut 35 threaded on the hub. Secured to the backing plate or cover by fastening means 37, is a housing 39. The housing has a reduced portion 41 which is within the drum enclosure and journals by means of bearings 43 (see Figure 4), a shaft 45 terminating in a pinion 47 which is in mesh with the ring gear 33. The cover 49 of the housing is fastened by screws 51. To the cover 49 is secured as at 53 a tubular extension 55. This extension is for a purpose to be later described. A separable extension 57 is secured to tubular extension 55 by screws 59.

The end of shaft 45 is formed with a tubular bore 61 and is also provided with a radial flange 63. Mounted to slide axially within bore 61 and arranged for rotation with shaft 45 is a shaft 65 having at its end remote from bore 61 a spiral thread 67. Between the closed bottom of the housing 39 and the cover 49 is an inertia responsive weight formed by uniting two annular members 71 and 73 by axially extending fastening means 75. Thrust members at 77 perform an obvious function. The member 71 is provided with an internal thread to fit the spiral formation at 67 on shaft 65. The member 73 is rotatably supported on shaft 65. Member 73 has a marginal flange 79 and between this flange and flange 63 on shaft 45 is a preloaded clock spring 81. Within the bore of extension 55 is a reciprocable plunger 83. Anti-friction thrust members 85 are located between plunger 83 and a disc 87 having a stem press fitted into the end of shaft 65.

Plunger 83 engages a disc 89 pinned to the end of the stem of a valve 91, the valve 91 adapted to engage a seat 93 under the influence of a spring 95. The spring 95 occupies a chamber 97 communicating with a threaded outlet 99 and also communicating with a chamber 101 by means of passages 103 when the valve 91 is off its seat. Threaded inlet 105 is always in communication with space 101. To limit the movements of shaft 65 it is provided with a flange 107 having segmental projections 109 adapted to engage abutments 111 in recesses in the opposed faces of the two parts 71 and 73 of the inertia responsive member.

At 105 is connected a pipe 113 leading to the source of fluid pressure, the conventional master cylinder of the hydraulic brake system. From outlet 99 a conduit 115 leads to the conventional fluid inlet 117 of the wheel cylinder 27. Figure 2 shows the conventional air bleed for the wheel cylinder at 119.

When the device is assembled the parts occupy the positions shown by Figure 4, shaft 65 holding the valve 91 open against the resilient resistance of its spring 95. The flange segments of shaft 65 are in contact with part 71 and the main spring 81 is preloaded in a direction tending to so rotate the inertia members as to reciprocate shaft 65 to the open valve position. As the vehicle is driven the rotation of the gear and pinion rotates both shafts 45 and 65 within the housing 39, the inertia member 71, 73 rotating together with these shafts. If the vehicle is decelerated in a normal manner by the brakes the device in no way interferes with the braking action. The fluid pressure is transmitted from the master cylinder through opening 105 and into chamber 101. The fluid then passes through the open valve 91 through passages 103, into chamber 97 and thence through outlet 99 into conduit 115 to the wheel cylinder. The vehicle travel is checked by the decelerating effect of the brake at each of the several wheels as the shoes 23 frictionally engage the drums 11.

During the process of vehicle deceleration, one of the wheels might cease to rotate. This would occur if the friction between the shoe and drum at that wheel became great enough to overcome the friction between the wheel tread and road surface. This frequently occurs when one of the wheels contacts a slippery road surface. Immediately upon the stopping of the wheel the shafts 45 and 65 cease rotation. The member 71, 73 then continues to rotate because of its inertia and this rotation effects a reciprocation of shaft 65 to the right because of the spiral thread connection. The limitation of such reciprocation is determined by the stop device 109, 111. Such reciprocation permits spring 95 to close the valve 91 so that no added pressure may be applied by the master cylinder through the fluid column to the wheel cylinder. It also enlarges the capacity of chamber 97 so that the fluid may flow from the wheel cylinder back into chamber 97, thus relieving the fluid pressure on the shoes and permitting the brake to be released by the spring 25. This action is accompanied by an increase in the potential resiliency of the spring 81. Almost instantly then the wheel is freed and rotates in response to the continued travel of the moving vehicle. The gearing 33, 47 and the spring 81 thereupon reverse the direction of travel of the shaft 65 causing it to move to the left again reducing the capacity of chamber 97 and causing the fluid therein to flow back into the wheel cylinder. This, in turn, increases the braking pressure on the wheel again. If the fluid displaced from chamber 97 is sufficient to increase the braking force up to a point sufficient to start the wheel to slide again, the valve is not opened. If, however, for any reason, such as an expansion of the drum with heat, the volume of fluid displaced from chamber 97 is not sufficient to bring the braking force up to the point of sliding the wheel, the shaft 65 continues onward to the left, opening the valve to the line pressure from the main cylinder. There is another characteristic to be observed in this connection with this automatic control. The coefficient of friction between the tire and the road varies with car speed. The high speeds having a higher coefficient of friction than the low speeds. If the brake is applied with sufficient force to slide the wheel when the car is at a high speed, the governor must not only release the pressure but must reapply it with successive decreasing force as the car velocity decreases in order to prevent the wheel again sliding. This action is carried out very well by the governor which supplies the braking force automatically without opening the valve to the master cylinder. It will thus be apparent that each wheel brake will do its utmost to supplement the others in checking vehicle travel. Any excessive braking which, in the case of a conventional braking system, might lock one or both the steering wheels and deprive the operator of his control of the vehicle is avoided by this invention which immediately releases the brakes of such a wheel and renders it useful for steering. The operator driving with hazardous traction must ordinarily use greater caution in brake applications to avoid losing steering control. He thus fails to get the most effective braking. With the present invention he may apply his brakes without fear of losing steering control and he may therefore at all times obtain the full vehicle deceleration which the several brakes can give.

In the past, effort has been made to provide devices which interfere with the action of vehicle brakes but these devices for the most part release groups of brakes. This invention is distinctly not of this type. This invention aims not to sacrifice braking but to make available the maximum deceleration which the brakes can give. There have also been proposed governor devices associated with individual wheels. These were usually responsive to the velocity of wheel rotation and not to wheel deceleration. With such prior devices, as the wheel rotates more and more slowly, the brakes are gradually released. With the present invention wherein the brake release is responsive not to wheel velocity but to wheel deceleration, the brakes remain in full effect as the wheel comes to a normal stop. To simplify the explanation the action of the inertia device has been described as due to the deceleration of a wheel from a considerable speed to a locked condition. It should be explained that the operation does not necessarily wait for the wheel to be actually brought to rest. Any rapid decelerating rotation between two wheel velocities will obviously function to introduce the brake control and may serve to correct the difficulty before the wheel actually comes to rest. The essential consideration is the rate of change in absolute velocity. If that change is slow, the preloaded spring 81 will not be overcome and the normal function of the brake will not be modified. But if the rate of change is rapid as where the wheel is locked or is being retarded at a rate which will presently lock it, the mechanism comes to the rescue.

It will be understoood that changes from the specific embodiment shown herein may and probably will be made, the form shown represents only an embodiment by which the inventive idea is realized. The claims are to be understood as not restricted to this embodiment and are intended to afford protection insofar as the prior art permits.

I claim:

1. For use with a vehicle, wheel brakes for retarding the rotation thereof, a hydraulic system for actuating brakes including a source of pressure, a wheel motor and a connecting conduit, a valve in said conduit, spring means to close said valve and mechanism normally operable to overcome said spring means and to hold said valve open, said mechanism including a part movable in response to a predetermined wheel deceleration to release said valve to the influence of said spring, said mechanism also including a chamber constituting a part of the conduit located between the valve and fluid motor, said chamber adapted to have increased capacity simultaneously with the closure of the valve.

2. In a vehicle, a wheel, frictional braking means associated with said wheel, a hydraulic motor to actuate said braking means, a source of pressure and a conduit therefrom to said motor, a first shaft, gearing between said first shaft and said wheel, a second and coaxial shaft mounted to rotate with but to reciprocate relative to said first shaft, a weight having threaded connection with said second shaft, a first and prestressed spring connecting said weight with the first shaft, a valve adapted to close said conduit, a second spring to bias said valve to closed position, said first spring operable to rotate said weight to a predetermined limit whereby the second shaft may reciprocate and overcome said second spring and hold said valve open, said weight adapted, by its inertia, to reversely reciprocate said shaft in response to predetermined vehicle deceleration whereby the second spring may close the valve.

3. The invention defined by claim 2, said conduit including a chamber on the motor side of said valve, said chamber adapted to be increased in capacity by the last mentioned movement of said second shaft to permit the discharge of fluid from said motor to said chamber.

4. In a vehicle having steering wheels mounted for independent rotation and differentially connected driving wheels, brake means associated with each wheel, and brake control mechanism associated with each wheel to release the brake means thereof in response to a predetermined deceleration of said wheel, said braking means including a frictionally operating retarding means, a fluid motor, a conduit connected thereto and affording communication with a pressure source, a valve member in said conduit, means to bias said valve member to closed position, said mechanism including a part normally in contact with said valve member and operable to overcome said biasing means but movable from contact with said valve member to release said valve to the influence of said biasing means.

5. In a vehicle having steering wheels mounted for independent rotation and differentially connected driving wheels, brake means associated with each wheel, and brake control mechanism associated with each wheel to release the brake means thereof in response to a predetermined deceleration of said wheel, said braking means including a frictionally operating retarding means, a fluid motor, a conduit connected thereto and affording communication with a pressure source, a valve member in said conduit, means to bias said valve member to closed position, said mechanism including a part normally in contact with said valve member and operable to overcome said biasing means but movable from contact with said valve member to release said valve to the influence of said biasing means, together with a chamber in said conduit between said valve and motor, said chamber adapted to be enlarged by the movement of said part as it functions to permit closure of said valve.

6. In a vehicle having steering wheels and driving wheels, hydraulic brake means associated with each wheel, brake control means associated with each wheel and operable automatically to release the brake means in response to a predetermined deceleration of said wheel, and also automatically to restore said braking, said brake means including a spring closed valve adjacent each wheel and said automatic control means including a wheel drum member, an inertia mass, a spring connecting said drum member and mass, said automatic control means being adapted to release said valve to the influence of its spring in the operation of brake release and to normally restore said braking without again opening said valve.

7. In a vehicle having steering wheels and driving wheels, hydraulic brake means associated with each wheel, brake control means associated with each wheel and operable automatically to release the brake means in response to a predetermined deceleration of said wheel, and also automatically to restore said braking, said brake means including a spring closed valve adjacent each wheel and said automatic control means including a wheel drum member, an inertia mass, a spring connecting said drum member and mass, said automatic control means being adapted to release said valve to the influence of its spring in the operation of brake release and to normally restore said braking without again opening said valve, but adapted to open said valve in the event of drum expansion.

THOMAS J. CARMICHAEL.